Oct. 15, 1968  V. HECHT  3,405,917

CARBURETOR

Filed May 16, 1966  2 Sheets-Sheet 1

INVENTOR.
VICTOR HECHT
BY John H. Widdowson
Phillip A. Rein
ATTORNEYS

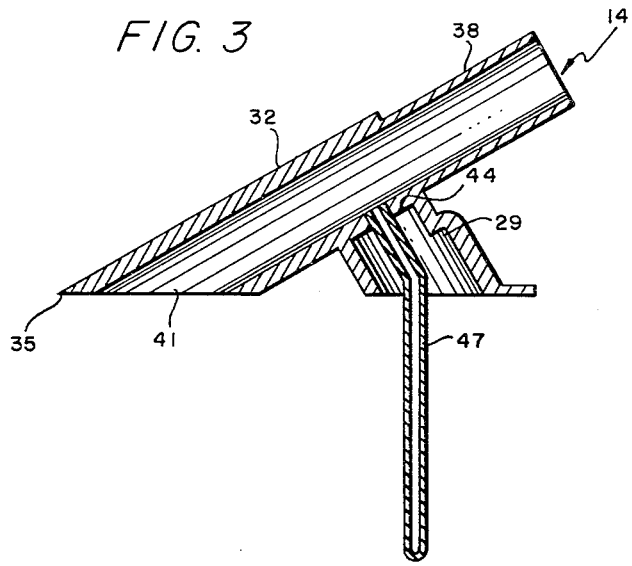
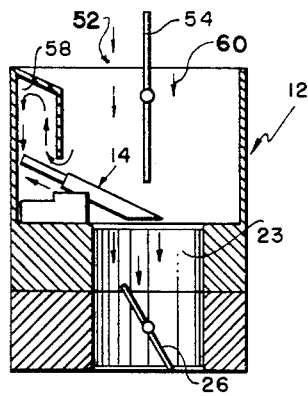
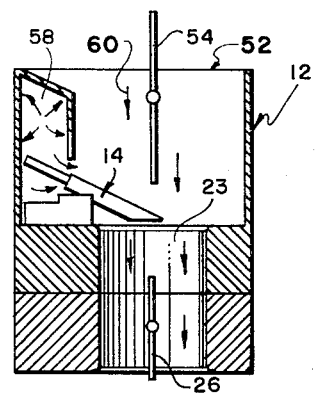
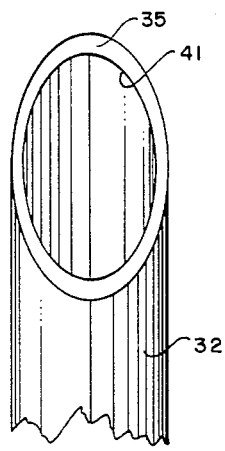
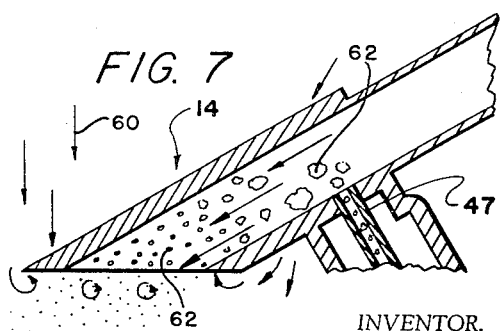
INVENTOR.
VICTOR HECHT

United States Patent Office 3,405,917
Patented Oct. 15, 1968

3,405,917
CARBURETOR
Victor Hecht, 969 Alexander, Haysville, Kans. 67060
Filed May 16, 1966, Ser. No. 550,291
2 Claims. (Cl. 261—23)

ABSTRACT OF THE DISCLOSURE

A carburetor having a fuel feed block with a pair of inclined feed tube members. Each tube has a feathered lower end extending horizontally within the fuel and air mixing conduit and an upper end extending into a cavity shielded from the direct flow of air through the fuel and air mixture conduit.

---

This invention relates to carburetors, and, more particularly, to fuel metering controls used in carburetors. Still more specifically, this invention relates to an air-fuel charge forming device for use in internal combustion engines for obtaining high engine efficiency and performance.

Various fuel supply nozzle structures for internal combustion engines are known to the prior art attempting to provide a high level of performance and efficiency with smooth engine operation at all speed levels. Many prior art devices are structurally complicated and expensive to manufacture using a plurality of fuel nozzles to sequentially inject fuel at various stages of operation to maintain smooth performance and rapid engine response to acceleration. Additionally, the prior art devices use venturi principles to create an increase in air velocity with a resultant decrease in air pressure which acts to convey fuel from the fuel reservoir that is under the higher atmospheric pressure.

In accordance with the present invention, a new fuel metering control means for a carburetor used on an internal combustion engine is provided having an irregular shaped body or base supporting a pair of downwardly inclined diverging feed tube members. Each feed tube member has a fuel nozzle tube connected thereto adapted to receive and convey fuel from the fuel bowl of the carburetor. The feed tubes are inclined approximately 45 degrees and have lower end portions positioned centrally of a pair of mixture feed conduits of the carburetor, respectively. The mixture conduits are a portion of a main air supply channel receiving air through an air cleaner for mixing with the fuel and conveyance into the intake manifold of the internal combustion engine. The upper ends of the feed tube members are positioned within a protective casing so as to receive air from the main channel but so as to not be in the direct air flow therethrough. The lower ends of the feed tubes have horizontally extended lowermost surfaces positioned centrally and adjacent upper restricted portions of the mixture conduits, respectively. The carburetor is adapted to receive the air cleaner on the top inlet portion of the main channel and is provided with a choke valve and a throttle valve in each mixture conduit to control the air-fuel mixture therethrough.

Accordingly, it is an object of this invention to provide a new and novel fuel metering control means for a carburetor.

Another object of this invention is to provide a metering control means adapted to be readily installed in conventional carburetors to properly control the supply of fuel for high engine efficiency and performance.

Still another object of this invention is to provide a carburetor for internal combustion engines having a fuel metering control means operable under vacuum principles to accurately supply the proper amount of fuel under all operating conditions for complete combustion of the air-fuel mixture.

One other object of this invention is to provide a fuel metering control means for a carburetor having a discharge orifice operable to create severe air turbulence for complete atomization of the air-fuel mixture resulting in efficient combustion.

Still one other object of this invention to is provide a fuel metering control means that is inexpensive to manufacture, efficient and simple in operation, substantially maintenance free, and readily adaptable for use in conventional carburetors.

Various other objects, advantages and features of the invention will become apparent to those skilled in the art from the following discussion, taken in conjunction with the accompanying drawings, in which:

FIG. 3 is an enlarged fragmentary sectional view taken along lines 3—3 in FIG. 1;

FIG. 4 is an enlarged fragmentary bottom plan view of a feed tube of the metering control means of this invention;

FIGS. 5 and 6 are schematic diagrams of the carburetor of this invention illustrating the resultant air flow with the fuel metering control means at various stages of engine operation; and FIG. 7 is an enlarged schematic view illustrating the resultant air flow about a feed tube of the metering control means of this invention.

Figure 1:
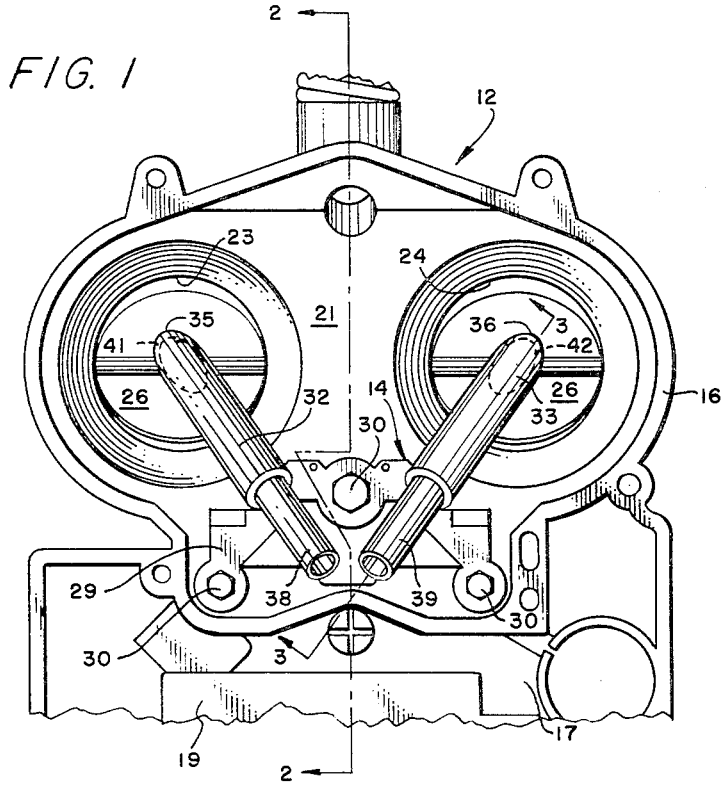
FIG. 1 is a fragmentary top plan view of a carburetor having the fuel metering control means of this invention installed therein with the upper portion of the carburetor removed for clarity.

The following is a discussion and description of preferred specific embodiments of the new fuel metering control means of this invention, such being made with reference to the drawings whereupon the same reference numerals are used to indicate the same or similar parts and/or structure. It is to be understood that such discussion and description are not to unduly limit the scope of the invention.

Referring to the drawings in detail and particularly to FIG. 1, a carburetor is shown generally at 12 having a fuel metering control means 14 of this invention connected thereto. Since the carburetor 12 is of a standard type as found in internal combustion engines used in automobiles and the like, only a portion thereof has been illustrated. The carburetor 12 includes a support base or body 16 having a portion thereof formed into a fuel bowl or a reservoir 17 connected as by a fuel line to a fuel tank (not shown). A fuel float 19 maintains a proper fuel level in the bowl 17. The carburetor 12 as illustrated is of a dual type having a main channel 21 with the lower portion divided into two fuel mixture conduits 23 and 24. The lower section of the body 16 is connected as by bolts to the intake manifold to supply an air-fuel mixture to individual combustion chambers formed by cylinders and pistons (not shown) as found in conventional internal combustion engines.

Each of the mixture conduits 23 and 24 are of a circular shape in transverse cross section having radially outward upper and lower end portions giving a slight venturi orifice effect to the air flow therethrough. Within the mixture conduits 23 and 24 are mounted throttle flapper valves 26 on a common throttle shaft 27 actuated by an accelerator pedal (not shown) or the like in a conventional manner. It is seen that the throttle flapper valves 26 are movable between the closed and fully opened positions to control the amount of air-fuel mixture therethrough regulating the resultant engine output.

Figure 2:
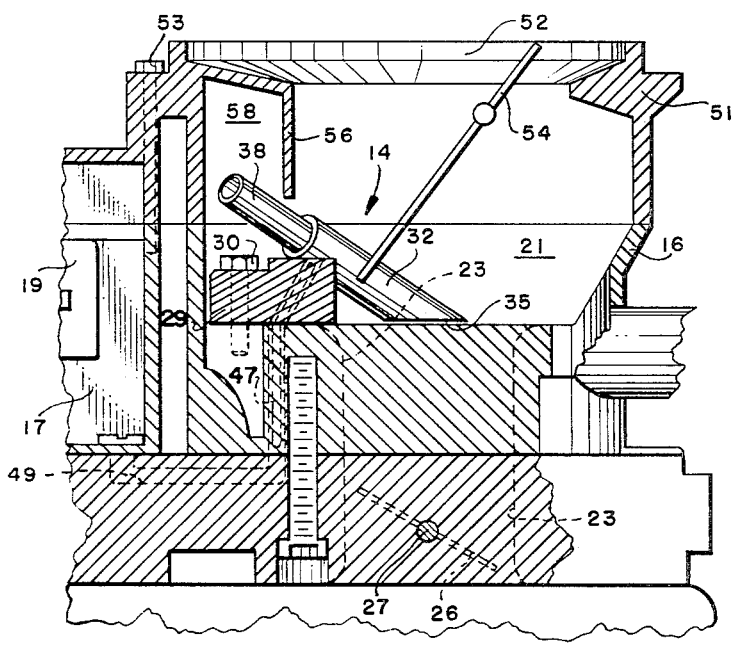
FIG. 2 is a sectional view taken along lines 2—2 in FIG. 1 having the upper portion of the carburetor connected thereto.

As shown in FIGS. 1 and 2, mounted with the main channel 21 is the metering control means 14 having an irregular shaped cast base 29 secured as by bolts 30 to an upper flat surface of the body 16. Integral with the base 29 is a pair of inclined feed tubes 32 and 33 extended downwardly divergent into the mixture conduits 23 and 24, respectively. The lower most end surfaces 35 and 36 of the feed tubes 32 and 33 are centered relative to the conduits 23 and 24 and extended horizontally. The upper ends 38 and 39 of the feed tubes 32 and 33 open in adjacent relation over the main portion of the cast base 29 for reasons to become obvious. The angular cut in the feed tubes 32 and 33 results in elliptical shaped openings known as discharge orifices 41 and 42 (FIG. 4) having in a greater orifice circumference for advantageous purposes as will be explained. The feed tubes 32 and 33 have central openings 44 and 45, respectively, in which are mounted primary fuel nozzles 47 (only one shown) extended downwardly to a passageway 49 common to the fuel bowl 17 for conveying fuel therefrom as required.

The carburetor 12 has an upper cap member 51 secured to the body 16 as by bolts 53 to cover the fuel bowl 17 and the main channel 21 for directing air from an air cleaner (not shown) attachable to the upper portion of the cap member 51. The cap member 51 is formed with an inlet opening 52 above the mixture conduits 23 and 24 for supplying air thereto. A choke valve 54 mounted on the cap member 51 extends transversely of the inlet opening 52 and is operable to control the air available to the mixture conduits 23 and 24 to control the air-fuel mixture during extreme temperature variations and initial starting of the engine as in a conventional choking operation. It is obvious that the choke valve 54 is operated in a conventional manner to supply a fuel rich mixture to the combustion chambers for starting purposes and the like.

The cap member 51 is provided with an upright wall 56 forming one side of the inlet opening 52 and providing a cavity 58 in cooperation with the support body 16. The upper inlet ends 38 and 39 of the feed tubes 32 and 33 extend transversely of the upright wall 56 into the cavity 58. It is seen that there is provided a spacing between the upright wall 56 and the feed tubes 32 and 33 whereby air is free to move into the open upper ends thereof.

It is seen that the fuel metering control means 14 of this invention is readily attachable to the conventional carburetor 12 on removing the bolts 53 and the cap member 51 and replacing a standard metering control means (not shown) by the control means 14 of this invention. The size and shape of the cast base 29 is not critical, and such can be selectively constructed to fit the existing mounting holes in the support base of standard carburetors. A major concern is the placement of the lower discharge orifices 41 and 42 of the feed tubes 32 and 33 respectively, adjacent and above the mixture conduits 23 and 24 and having the upper inlet ends 38 and 39 positioned within a shielded portion so as to be out of the main air flow through the main channel 21. The actual positioning of the upper ends of the feed tubes 32 and 33 within the cavity 58 is used in regulating the air-fuel mixture as will be explained.

In the use and operation of the carburetor 12 having the new and novel fuel metering control means 14 of this invention, it shall be assumed that the internal combustion engine to which the carburetor is attached is warmed and the choke valve 54 is in the fully opened position (FIGS. 5 and 6). On opening the throttle valves 26 to the one-half position as shown in FIG. 5, the suction created on the intake stroke of the engine operates to pull air indicated by the arrows at 60 through the air cleaner (not shown) through the opening 52 and into the mixture conduits 23 and 24. This accelerated air moving past the discharge orifices 41 and 42 of the feed tubes 32 and 33, respectively, acts to create a decreased pressure or vacuum and a resultant downward pull therewithin. At the same time, the fuel bowl 17 is under atmospheric pressure and the lower pressure in the feed tubes 32 and 33 results in fuel flow in the primary nozzles 47 for discharge out the orifices 41 and 42, respectively. Additionally, the air within the cavity 58 is of a pressure intermediate the orifice and atmospheric pressures whereby air is drawn into the inlet ends 38 and 39 to pick up the fuel discharged from the primary nozzles 47.

It is noted that as the air velocity increases within the main channel 21 and into the mixture conduits 23 and 24, the air within the cavity 58 decreases in pressure towards a "deadened air" state due to the rapid air flow past the wall 56 similarly to the vacuum created at the discharge orifices 41 and 42. It is obvious that as the pressure decreases in the cavity 58, less air is drawn within the inlet ends 38 and 39 resulting in an increased amount of fuel injected from the primary nozzles 47 for a richer air-fuel mixture to achieve higher engine speed and performance.

On reaching the fully opened position of the throttle valves 26 as shown in FIG. 6, the mixture ejected from the discharge orifices 41 and 42 is substantially pure fuel which is mixed with the incoming air through opening 52 for movement through the mixture conduits 23 and 24.

The size, shape, and horizontal position of the discharge orifices 41 and 42 adjacent the inlet to the mixture conduits 23 and 24 respectively, operates to achieve a complete atomization of the fuel indicated at 62 ejected from the feed tubes 32 and 33 (FIG. 7). The peripheral edges of the discharge orifices 41 and 42 operate similarly as an air foil to create extreme turbulence in this area providing a homogeneous air-fuel mixture into the piston cylinders for complete and efficient combustion. The feed tubes 32 and 33 are inclined approximately 45 degrees to the mixing conduits 23 and 24, respectively, which has been proven by extensive testing to achieve the most efficient operation. However, it is obvious that the length, diameter, and position of the tube members can be slightly altered depending upon the particular carburetor with the same results of increased gas mileage, high efficiency, and complete combustion with a minimum of carbon monoxide discharged with the engine exhaust. The length of the upper inlet ends 38 and 39 of the feed tubes 32 and 33 can be varied to control the air-fuel mixture as, for example, a longer inlet end results in a leaner fuel mixture due to the difference in pressure as one moves away from the main channel 21.

An extremely important feature of this invention is the complete control of the air-fuel ratio mixture by the air stream through the carburetor. In the standard carburetors using venturi orifice structures, the air stream continues to operate on rapid deceleration (closing of the throttle valve) to carry the rich air-fuel mixture into the piston cylinders resulting in a delayed action or "after surge" of the engine. Since the metering control device of this invention operates under a vacuum pull in conjunction with controlled air flow into the inlet ends of the feed tubes, the rapid deceleration results in an instantaneous cessation of fuel flow thereby eliminating the "after surge" found in the carburetors of the prior art. This is achieved because the vacuum is immediately eliminated on closing the throttle valves 26 with the trapped air being able to move into the feed tubes 32 and 33 and the cavity 58 without resistance to immediately stop the fuel flow.

It is obvious that the fuel metering control means of this invention can be used in all types of engines wherein the air-fuel mixture is required. This device results in efficient combustion thereby eliminating the need of anti-smog devices to remove unburnt fuel particles and carbon monoxide from the exhaust gases.

As will be apparent from the foregoing description of the preferred embodiments of applicant's fuel metering control means, a relatively simple and inexpensive means has been provided which is readily attachable to existing carburetors so as to provide a novel and effective means of achieving the ideal air-fuel ratios for complete combustion. Applicant's structure achieves an ideal air flow operating condition within carburetors conveying an air-fuel mixture which is directly proportional to the required engine speed thereby providing greatly increased fuel economy and ideal engine operating characteristics. It is seen that the applicant's device is relatively simple to manufacture, easy to install, and results in a large monetary savings in greater fuel economy.

I claim:

1. A carburetor for supplying an air-fuel mixture comprising:
   (a) a body having at least one fuel-air mixture conduit therethrough and an upright shield portion to provide a cavity extended entirely laterally and out of the main flow of said mixture conduit,
   (b) a fuel reservoir formed within said body,
   (c) fuel metering means mounted within said body having a feed tube angularly inclined relative to said mixture conduit,
   (d) said feed tube having a lower end portion positioned within said mixture conduit, said lower end portion of said feed tube having a feathered edge extended horizontally to create turbulence thereabout for complete atomization of the fuel, and an upper end portion extended outwardly of said mixture conduit into said cavity, said upper end portion of said feed tube positioned away from and above the lower edge of said shield portion to assure prevention of direct air flow acting on said upper end,
   (e) means supplying fuel to said feed tube from said reservoir,
   (f) throttle means connected to said body extended transversely of said mixture conduit selectively movable between substantially closed and substantially fully opened positions to control air flow through said mixture conduit, and
   (g) means supplying air to said mixture conduit to create a vacuum at said lower end portion of said feed tube to draw air into said upper end portion as required to pick fuel from said fuel supply means for discharge into said mixture conduit in the required amount.

2. A carburetor according to claim 1, wherein:
   (a) said upright shield is provided with an upper member connected at one end portion to said body and positioned so that the other end of said upper member extends therefrom at an acute angle with respect to a horizontal plane of said carburetor, and an upright member attached and positioned at one end to the extending end portion of said upper member so that said upright member is maintained parallel to the sidewalls of said body; and
   (b) said carburetor having a plurality of feed tubes and mixture conduits, wherein said means supplying fuel to said feed tubes are nozzle members, each being connected at one end portion in a flush, fluid communicating relationship with each of said feed tubes and the other end of said nozzles being in fluid communication with said fuel reservoir.

References Cited

UNITED STATES PATENTS

| | | | |
|---|---|---|---|
| 2,080,569 | 5/1937 | Holley | 261—121 X |
| 2,771,282 | 11/1956 | Olson et al. | 261—23 |
| 2,796,243 | 6/1957 | McDuffie | 261—72 X |

FOREIGN PATENTS 676,706  11/1929  France.

RONALD R. WEAVER, *Primary Examiner.*